(12) United States Patent
Kagami et al.

(10) Patent No.: US 11,450,155 B2
(45) Date of Patent: Sep. 20, 2022

(54) VEHICLE

(71) Applicant: TOYOTA JIDOSHA KABUSHIKI KAISHA, Toyota (JP)

(72) Inventors: Masahiro Kagami, Chiryu (JP); Takashi Ogura, Seto (JP); Yoshiaki Kikuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 16/796,246

(22) Filed: Feb. 20, 2020

(65) Prior Publication Data

US 2020/0279443 A1 Sep. 3, 2020

(30) Foreign Application Priority Data

Feb. 28, 2019 (JP) .............................. JP2019-035412

(51) Int. Cl.
  *G07C 5/08* (2006.01)
  *G07C 5/00* (2006.01)
  *B60W 50/02* (2012.01)
  *B60W 40/08* (2012.01)
  *G06F 8/65* (2018.01)

(52) U.S. Cl.
  CPC ............ *G07C 5/0808* (2013.01); *B60W 40/08* (2013.01); *B60W 50/0205* (2013.01); *G06F 8/65* (2013.01); *G07C 5/008* (2013.01); *B60W 2040/0881* (2013.01); *B60W 2050/021* (2013.01)

(58) Field of Classification Search
  CPC ..... G07C 5/0808; G07C 5/008; B60W 40/08; B60W 50/0205; G06F 8/65

USPC .................................................. 701/31.4, 23
See application file for complete search history.

(56) References Cited

U.S. PATENT DOCUMENTS

| 2007/0299575 | A1  | 12/2007 | Yamada et al. |
| 2017/0039784 | A1* | 2/2017  | Gelbart .................. G07C 5/00 |
| 2017/0297606 | A1* | 10/2017 | Kim ...................... B62D 1/185 |
| 2019/0156599 | A1* | 5/2019  | Jammoussi ......... B60W 30/146 |
| 2020/0174779 | A1* | 6/2020  | David ....................... G06F 8/65 |

FOREIGN PATENT DOCUMENTS

| JP | 2008-001233 A  | 1/2008 |
| JP | 2016-060407 A  | 4/2016 |
| JP | 2017-172552 A  | 9/2017 |

* cited by examiner

*Primary Examiner* — Isaac G Smith
(74) *Attorney, Agent, or Firm* — Sughrue Mion, PLLC (57) ABSTRACT

When a traveling state of a vehicle is switched, the vehicle requests delivery of an update program from an OTA server. For example, when the vehicle travels with an occupant on board, the vehicle requests delivery of an update program for manned vehicle traveling from the OTA server. When the vehicle travels with an occupant not on board, the vehicle requests delivery of an update program for unmanned vehicle traveling from the OTA server. When the OTA server receives the request for delivery of the update program for manned vehicle traveling/unmanned vehicle traveling, the OTA server delivers the requested update program for manned vehicle traveling/unmanned vehicle traveling to the vehicle. The vehicle updates a diagnosis program using the received update program for manned vehicle traveling/unmanned vehicle traveling.

2 Claims, 6 Drawing Sheets

VEHICLE

This nonprovisional application is based on Japanese Patent Application No. 2019-035412 filed on Feb. 28, 2019 with the Japan Patent Office, the entire contents of which are hereby incorporated by reference.

BACKGROUND

Field

The present disclosure relates to a vehicle capable of automated driving.

Description of the Background Art

The technique of updating a program of a vehicle by so-called OTA (Over The Air) is known. For example, Japanese Patent Laying-Open No. 2016-60407 discloses an update system including a vehicle, a portable communication terminal of a user of the vehicle, and a server that delivers an update program for updating a program of the vehicle. In the update system, the update program is delivered from the server to the portable communication terminal, and the vehicle obtains the update program through the portable communication terminal and updates the program.

SUMMARY

A program updated by the OTA includes, for example, a program for detecting a failure of a vehicle-mountable device (hereinafter, also referred to as "diagnosis program"). The diagnosis program is executed, for example, when a diagnosis condition is satisfied during traveling of a vehicle. When the diagnosis program is executed, a property of the device to be diagnosed is, for example, calculated and the presence or absence of the failure is diagnosed based on whether or not the calculated property falls within a threshold range.

Update of the diagnosis program by the OTA may include update that makes it possible to detect a potential failure in addition to an actual failure. This is for inhibiting detection of the potential failure from leading to the actual failure when a user is on board. Examples of the update for detecting the potential failure include, for example, setting the threshold range (range in which a normal state of the device is detected) of the diagnosis program to be narrower, and changing a sequence for calculating the property of the device into a sequence that makes detection of the failure easier. In the following description, updating the diagnosis program such that the potential failure can be detected in addition to the actual failure will also be referred to as "making the diagnosis program sensitive".

However, when the diagnosis program is made sensitive, the potential failure is also detected in addition to the actual failure, and thus, a result of execution of the diagnosis program may more often show an abnormality. Therefore, when the diagnosis program is made sensitive by the OTA while a vehicle capable of automated driving is, for example, traveling with a user on board, the possibility of detecting the failure when the user is on board is increased. Even if the failure is detected when the user is on board, traveling of the vehicle is not prohibited because the failure is not an actual failure. However, for example, traveling may be restricted, which may result in delayed arrival at a destination, or a warning may be provided, which may bring a feeling of anxiety to the user, or the user may suffer a disadvantage. Accordingly, it is desired to detect the potential failure of the vehicle-mountable device without causing any disadvantage to the user.

The present disclosure has been made to solve the above-described problem, and an object of the present disclosure is to, in a vehicle capable of automated driving, detect a potential failure of a vehicle-mountable device while reducing a disadvantage to a user.

A vehicle according to the present disclosure is a vehicle capable of automated driving, the vehicle including: a storage device that stores a program for diagnosing a failure of a device mounted on the vehicle; a controller that executes the program when a diagnosis condition is satisfied during traveling of the vehicle; and a communication device that communicates with a server that delivers an update program for updating the program. The server has, as the update program, a first update program applied when the vehicle travels with an occupant on board, and a second update program applied when the vehicle travels with an occupant not on board. The controller obtains the second update program from the server and updates the program using the obtained second update program, when the vehicle travels with an occupant not on board.

According to the above-described configuration, the second update program is obtained from the server and the program is updated using the second update program, when the vehicle travels with a user not on board (unmanned vehicle traveling). For example, by updating the program to make the program sensitive, a potential failure can be detected during unmanned vehicle traveling. By diagnosing the potential failure during unmanned vehicle traveling, some kind of measures can be taken, even if the potential failure is detected. The measures include preparation of another vehicle for the user planning to use the vehicle, and advance preparation of another means of transportation by the user himself/herself. That is, by diagnosing the potential failure during unmanned vehicle traveling, a disadvantage to the user can be reduced, even if the potential failure is detected. Therefore, it is possible to detect the potential failure of the vehicle-mountable device while reducing the disadvantage to the user.

In an embodiment, the controller determines the failure of the device based on whether or not a property of the device calculated by execution of the program is outside a threshold range. A threshold range included in the second update program is narrower than a threshold range included in the first update program.

According to the above-described configuration, the threshold range included in the second update program is set to be narrower than the threshold range included in the first update program. That is, the potential failure is detected more easily during unmanned vehicle traveling than during manned vehicle traveling. Thus, since the potential failure can be detected during unmanned vehicle traveling, a disadvantage to the user caused by the detection of the potential failure can be reduced. That is, it is possible to detect the potential failure of the vehicle-mountable device while reducing the disadvantage to the user.

In an embodiment, the controller obtains the first update program from the server and updates the program using the obtained first update program, when the vehicle travels with an occupant on board.

According to the above-described configuration, the program is updated, for example, every time a traveling state is switched between unmanned vehicle traveling and manned vehicle traveling. Specifically, when the traveling state is switched from unmanned vehicle traveling to manned vehicle traveling, the program is updated using the first update program, and when the traveling state is switched from manned vehicle traveling to unmanned vehicle traveling, the program is updated using the second update program. As a result, the actual failure and the potential failure can be detected during unmanned vehicle traveling, and the actual failure can be detected during manned vehicle traveling.

In an embodiment, a vehicle capable of automated driving includes: a storage device that stores a program for diagnosing a failure of a device mounted on the vehicle; a controller that executes the program when a diagnosis condition is satisfied during traveling of the vehicle; and a communication device that communicates with a server that delivers an update program for updating the program. The storage device stores, as the program, a first program used when the vehicle travels with an occupant on board, and a second program used when the vehicle travels with an occupant not on board. The server has, as the update program, a first update program applied when the vehicle travels with an occupant on board, and a second update program applied when the vehicle travels with an occupant not on board. The controller diagnoses the failure of the device using the first program when the vehicle travels with an occupant on board, and diagnoses the failure of the device using the second program when the vehicle travels with an occupant not on board. After the controller receives the first update program, the controller updates the first program using the received first update program. After the controller receives the second update program, the controller updates the second program using the received second update program.

According to the above-described configuration, the storage device stores the first program used in manned vehicle traveling, and the second program used in unmanned vehicle traveling. When there is a first update program including update that is newer than update applied to the current first program, the first program is updated using that first update program. When there is a second update program including update that is newer than update applied to the current second program, the second program is updated using that second update program. In accordance with the traveling state of the vehicle, e.g., whether the traveling state is manned vehicle traveling or unmanned vehicle traveling, the controller diagnoses the failure of the device using the above-described first or second program stored in the storage device. By making the second program sensitive, the potential failure can be detected during unmanned vehicle traveling. By diagnosing the potential failure during unmanned vehicle traveling, a disadvantage to the user can be reduced, even if the potential failure is detected. That is, it is possible to detect the potential failure of the vehicle-mountable device while reducing the disadvantage to the user.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments of the present disclosure will be described in detail hereinafter with reference to the drawings, in which the same or corresponding portions are denoted by the same reference characters and description thereof will not be repeated.

First Embodiment

<Overall Configuration>

Figure 1:
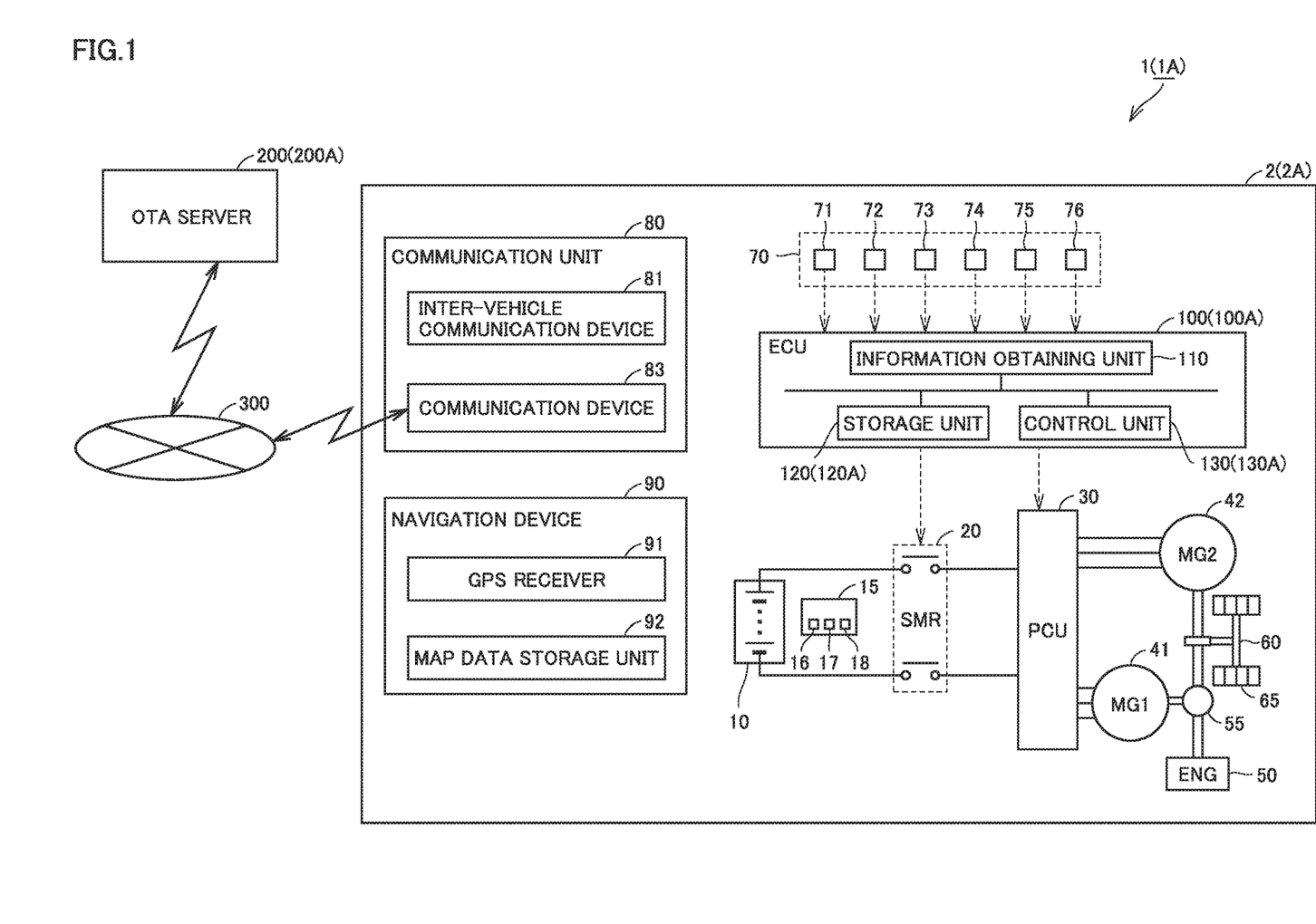
FIG. 1 schematically shows an overall configuration of an update system.

FIG. 1 schematically shows an overall configuration of an update system 1. Update system 1 includes a vehicle 2 and an OTA server 200.

OTA server 200 bidirectionally communicates with vehicle 2 through a communication network 300 such as the Internet. OTA server 200 has update programs for updating various programs of vehicle 2, and delivers the update programs to vehicle 2.

Vehicle 2 is a hybrid vehicle capable of automated driving. The automated driving refers to autonomous traveling of vehicle 2 based on information provided from various sensors and information provided from other vehicles, without any driving operation by an occupant of vehicle 2. In the automated driving, each actuator of vehicle 2 is, for example, controlled such that vehicle 2 autonomously travels along a travel path selected based on various types of information (information provided from a sensor group 70 and information provided from a navigation device 90 as described below). Vehicle 2 may be any vehicle as long as it is a vehicle capable of automated driving. For example, vehicle 2 may be a vehicle powered only by an internal combustion engine, or may be an electric vehicle or a fuel cell vehicle.

When vehicle 2 is a commercial vehicle used for car sharing in which an unspecified number of users share the vehicle, or used as a rental car rented to an unspecified number of users, vehicle 2 may, for example, travel with an occupant not on board in order to allow another user at another location to get on vehicle 2, after vehicle 2 takes a user to a destination. When vehicle 2 is a private vehicle, vehicle 2 may, for example, travel toward a home with an occupant not on board, after vehicle 2 takes a user to a destination. As described above, a traveling state of vehicle 2 according to a first embodiment can be switched between manned vehicle traveling in which vehicle 2 travels with an occupant on board and unmanned vehicle traveling in which vehicle 2 travels with an occupant not on board.

Vehicle 2 includes a power storage device 10, a monitoring unit 15, a system main relay (hereinafter, also referred to as "SMR") 20, a power control unit (hereinafter, also referred to as "PCU") 30, motor generators (hereinafter, also referred to as "MGs") 41 and 42, an engine 50, a power split device 55, a drive shaft 60, a driving wheel 65, and an ECU (Electronic Control Unit) 100. Vehicle 2 further includes sensor group 70, a communication unit 80 and navigation device 90.

Power storage device 10 is mounted on vehicle 2 as a driving power supply (i.e., a motive power source) for vehicle 2. Power storage device 10 includes a plurality of stacked batteries. Each of the batteries is a secondary battery such as, for example, a nickel-metal hydride battery or a lithium ion battery. Alternatively, each of the batteries may be a battery having a liquid electrolyte between a positive electrode and a negative electrode, or may be a battery having a solid electrolyte (all-solid-state battery). Power storage device 10 may be any power storage device as long as it is a rechargeable DC power supply, and a large-capacitance capacitor can also be used.

Monitoring unit 15 monitors a state of power storage device 10. Specifically, monitoring unit 15 includes a voltage sensor 16 that detects a voltage of power storage device 10, a current sensor 17 that detects a current input to and output from power storage device 10, and a temperature sensor 18 that detects a temperature of power storage device 10. Each sensor outputs a signal indicating the result of detection to ECU 100.

SMR 20 is electrically connected between PCU 30 and power storage device 10. When SMR 20 is closed, electric power is supplied from power storage device 10 to PCU 30. When SMR 20 is opened, electric power is not supplied from power storage device 10 to PCU 30.

In accordance with a control signal provided from ECU 100, PCU 30 converts DC power stored in power storage device 10 into AC power and supplies the AC power to motor generators 41 and 42. PCU 30 also converts AC power generated by motor generators 41 and 42 into DC power and supplies the DC power to power storage device 10. PCU 30 controls states of motor generators 41 and 42 individually. For example, PCU 30 can bring motor generator 42 into a power running state while bringing motor generator 41 into a regenerative state. PCU 30 includes, for example, two inverters provided to correspond to motor generators 41 and 42, and a converter that boosts a DC voltage supplied to each inverter into a voltage that is equal to or higher than an output voltage of power storage device 10.

Each of motor generators 41 and 42 is an AC rotating electric machine, and is, for example, a three-phase AC rotating electric machine including a permanent magnet embedded in a rotor (not shown). Motor generator 41 is coupled to a crank shaft of engine 50 with power split device 55 being interposed. Motor generator 41 rotates the crank shaft of engine 50 using the electric power of power storage device 10, when engine 50 is started. Motor generator 41 can also generate electric power using the motive power of engine 50. The AC power generated by motor generator 41 is converted by PCU 30 into DC power, which is charged into power storage device 10. The AC power generated by motor generator 41 may in some cases be supplied to motor generator 42.

Motor generator 42 rotates drive shaft 60 using at least one of the electric power supplied from power storage device 10 and the electric power generated by motor generator 41. Motor generator 42 can also generate electric power by regenerative braking during braking and during reduction in acceleration. The AC power generated by motor generator 42 is converted by PCU 30 into DC power, which is charged into power storage device 10.

Engine 50 is an internal combustion engine such as, for example, a gasoline engine or a diesel engine. Engine 50 is controlled in accordance with a control signal provided from ECU 100.

Power split device 55 is, for example, a planetary gear mechanism having three rotation shafts of a sun gear, a carrier and a ring gear. Power split device 55 divides the motive power generated by engine 50 into motive power transmitted to driving wheel 65 and motive power transmitted to motor generator 41.

Sensor group 70 includes various sensors that detect an external situation of vehicle 2 and detect the traveling state of vehicle 2. Specifically, sensor group 70 includes a camera 71, a radar 72, a LIDAR (Laser Imaging Detection and Ranging) 73, a vehicle speed sensor 74, an acceleration sensor 75, and a gyro sensor 76.

Camera 71 captures an image of the external situation of vehicle 2 and outputs the image information about the external situation of vehicle 2 to ECU 100.

Radar 72 transmits a radio wave (e.g., millimeter wave) to the surroundings of vehicle 2 and receives a radio wave reflected by an obstacle to thereby detect the obstacle. Radar 72 outputs, for example, a distance to the obstacle and a direction of the obstacle to ECU 100 as the obstacle information about the obstacle.

LIDAR 73 transmits light (typically, ultraviolet rays, visible rays or near-infrared rays) to the surroundings of vehicle 2 and receives light reflected by an obstacle to thereby measure a distance to a reflection point and detect the obstacle. LIDAR 73 outputs, for example, a distance to the obstacle and a direction of the obstacle to ECU 100 as the obstacle information.

Vehicle speed sensor 74 is provided at driving wheel 65, drive shaft 60 or the like of vehicle 2. Vehicle speed sensor 74 detects, for example, a rotation speed of driving wheel 65 and outputs the vehicle speed information including a speed of vehicle 2 to ECU 100.

Acceleration sensor 75 includes, for example, a front-back acceleration sensor that detects an acceleration of vehicle 2 in a front-back direction, and a lateral acceleration sensor that detects a lateral acceleration of vehicle 2. Acceleration sensor 75 outputs, to ECU 100, the acceleration information including both the acceleration of vehicle 2 in the front-back direction and the lateral acceleration of vehicle 2.

Gyro sensor 76 detects an inclination of vehicle 2 from a horizontal direction. Specifically, gyro sensor 76 detects an inclination of vehicle 2 in the front-back direction relative to the horizontal direction and an inclination of vehicle 2 in a right-left direction relative to the horizontal direction. Gyro sensor 76 outputs the result of detection to ECU 100 as the gradient information of the travel path of vehicle 2.

Communication unit 80 includes an inter-vehicle communication device 81 and a communication device 83. Inter-vehicle communication device 81 wirelessly communicates with other vehicles around vehicle 2. In inter-vehicle communication, information such as start, stop, acceleration, and deceleration is, for example, transmitted from a vehicle traveling at the front to a vehicle traveling at the back.

Communication device 83 bidirectionally communicates with OTA server 200 through communication network 300.

Navigation device 90 includes a GPS (Global Positioning System) receiver 91 that identifies a current location of vehicle 2 based on a radio wave provided from an artificial satellite, and a map data storage unit 92 that stores map data. Navigation device 90 performs various navigation processes of vehicle 2 using the information (GPS information) of the current location of vehicle 2 identified by GPS receiver 91. More specifically, navigation device 90 calculates a traveling route from the current location of vehicle 2 to a destination based on the GPS information of vehicle 2 and the road map data stored in map data storage unit 92, and outputs the information about the traveling route to ECU 100.

ECU 100 receives the signals from the respective sensors and outputs the control signals to the respective devices, and also controls the respective devices. The control can be implemented not only by software but also by dedicated hardware (electronic circuit).

ECU 100 includes an information obtaining unit 110, a storage unit 120 and a control unit 130. Information obtaining unit 110 obtains the result of detection by each sensor from sensor group 70. Information obtaining unit 110 also obtains the information from other vehicles through inter-vehicle communication device 81. Information obtaining unit 110 also obtains the information from OTA server 200 through communication device 83.

Storage unit 120 includes a ROM (Read Only Memory) and a RAM (Random Access Memory), and stores a program executed by ECU 100 and the like. The program stored in storage unit 120 includes a diagnosis program for self-diagnosing whether or not each device of vehicle 2 has a failure. Each device of vehicle 2 refers to, for example, power storage device 10, motor generators 41 and 42, engine 50, a cooling fan (not shown) of power storage device 10, a steering device (not shown), a braking device (not shown), a direction indicator (not shown) or the like. Storage unit 120 can also be separately provided outside ECU 100.

Control unit 130 expands the program stored in the ROM into the RAM for execution. During execution of automated driving, control unit 130 controls each actuator of vehicle 2 based on the information provided from sensor group 70, the information about the traveling route provided from navigation device 90, the information obtained from other vehicles by inter-vehicle communication, and the like. In addition, when a diagnosis condition is satisfied, control unit 130 executes the diagnosis program stored in storage unit 120 and self-diagnoses whether or not each vehicle-mountable device has a failure. When the diagnosis program is executed, a property of the device to be diagnosed is, for example, calculated and the presence or absence of the failure is diagnosed based on whether or not the calculated property is outside a threshold range. The threshold range refers to a range in which a normal state of the device is detected. That is, when the calculated property is not outside the threshold range, it is determined that the device does not have the failure, and when the calculated property is outside the threshold range, it is determined that the device has the failure.

The diagnosis condition is predetermined for each diagnosis item of each device, and when any one of the diagnosis conditions is satisfied, control unit 130 performs self-diagnosis corresponding to the satisfied diagnosis condition. The diagnosis conditions include, for example, arrival of a preset cycle, the prescribed number of times of repetitions of charging and discharging of power storage device 10 during traveling, variation in an output request to engine 50 by a prescribed amount or larger, traveling that requires the direction indicator to light up, and the like.

<Update of Diagnosis Program>

An update program for updating the diagnosis program, which is aimed at detecting a potential failure in addition to an actual failure, may be delivered from OTA server 200.

The actual failure refers to a failure that immediately requires device repair or replacement. The potential failure refers to a failure that does not necessarily immediately require device repair or replacement but may possibly lead to the actual failure. By updating the diagnosis program using the delivered update program, the potential failure can be detected, and thus, measures can be taken before the actual failure occurs in vehicle 2.

Examples of the above-described update program include, for example, setting the threshold range of the diagnosis program to be narrow enough to detect the potential failure, and changing a sequence for calculating the property of the device into a sequence that makes failure detection easier. That is, by updating the diagnosis program using the update program, the diagnosis program is made sensitive. By making the diagnosis program sensitive, the potential failure can be detected in addition to the actual failure. Depending on the degree of the detected failure, for example, traveling of vehicle 2 is prohibited, or traveling of vehicle 2 is restricted (such as, for example, restriction on an output), or a warning is provided. Specifically, when the actual failure is detected, traveling of vehicle 2 is prohibited, and when the potential failure is detected, traveling of vehicle 2 is restricted or a warning is provided, depending on the degree of the potential failure, the device and the like.

When the diagnosis program is made sensitive, the potential failure is also detected in addition to the actual failure, and thus, a result of execution of the diagnosis program may more often show an abnormality. Therefore, when the diagnosis program is made sensitive by the OTA while vehicle 2 is, for example, traveling with the user on board (during manned vehicle traveling), the possibility of detecting the failure when the user is on board is increased. When the failure is detected with the user on board, traveling may be restricted, which may result in delayed arrival at a destination, or a warning may be provided, which may bring a feeling of anxiety to the user, or the user may suffer a disadvantage, for example. Although it is important to detect the potential failure and take measures before the actual failure occurs in vehicle 2, it is desired to keep an appropriate balance with a disadvantage to the user, and detect the potential failure of the vehicle-mountable device while reducing the disadvantage to the user.

Accordingly, in manned vehicle traveling, vehicle 2 according to the first embodiment performs self-diagnosis using the diagnosis program that is not made sensitive, and in unmanned vehicle traveling, vehicle 2 according to the first embodiment performs self-diagnosis using the diagnosis program that is made sensitive. That is, in manned vehicle traveling, the self-diagnosis is performed to detect the actual failure, and in unmanned vehicle traveling, the self-diagnosis is performed to detect the potential failure in addition to the actual failure.

By detecting the potential failure in unmanned vehicle traveling, a disadvantage to the user can be reduced, even if the potential failure is detected. Specifically, assuming that vehicle 2 is, for example, a commercial vehicle used for car sharing, another vehicle can be dispatched to the user when the potential failure is detected during unmanned vehicle traveling. Assuming that vehicle 2 is, for example, a private vehicle, the user can prepare for another means of transportation in advance when the potential failure is detected during unmanned vehicle traveling.

In the first embodiment, the foregoing is achieved by updating the diagnosis program by the OTA as appropriate. Specifically, the threshold range of the diagnosis program is made different between manned vehicle traveling and unmanned vehicle traveling, or the sequence for calculating the property of the device is made different between manned vehicle traveling and unmanned vehicle traveling. The update timing of the diagnosis program and the threshold range will be sequentially described below, using the case of making the threshold range of the diagnosis program different between manned vehicle traveling and unmanned vehicle traveling.

<<Update Timing of Diagnosis Program>>

Figure 2:
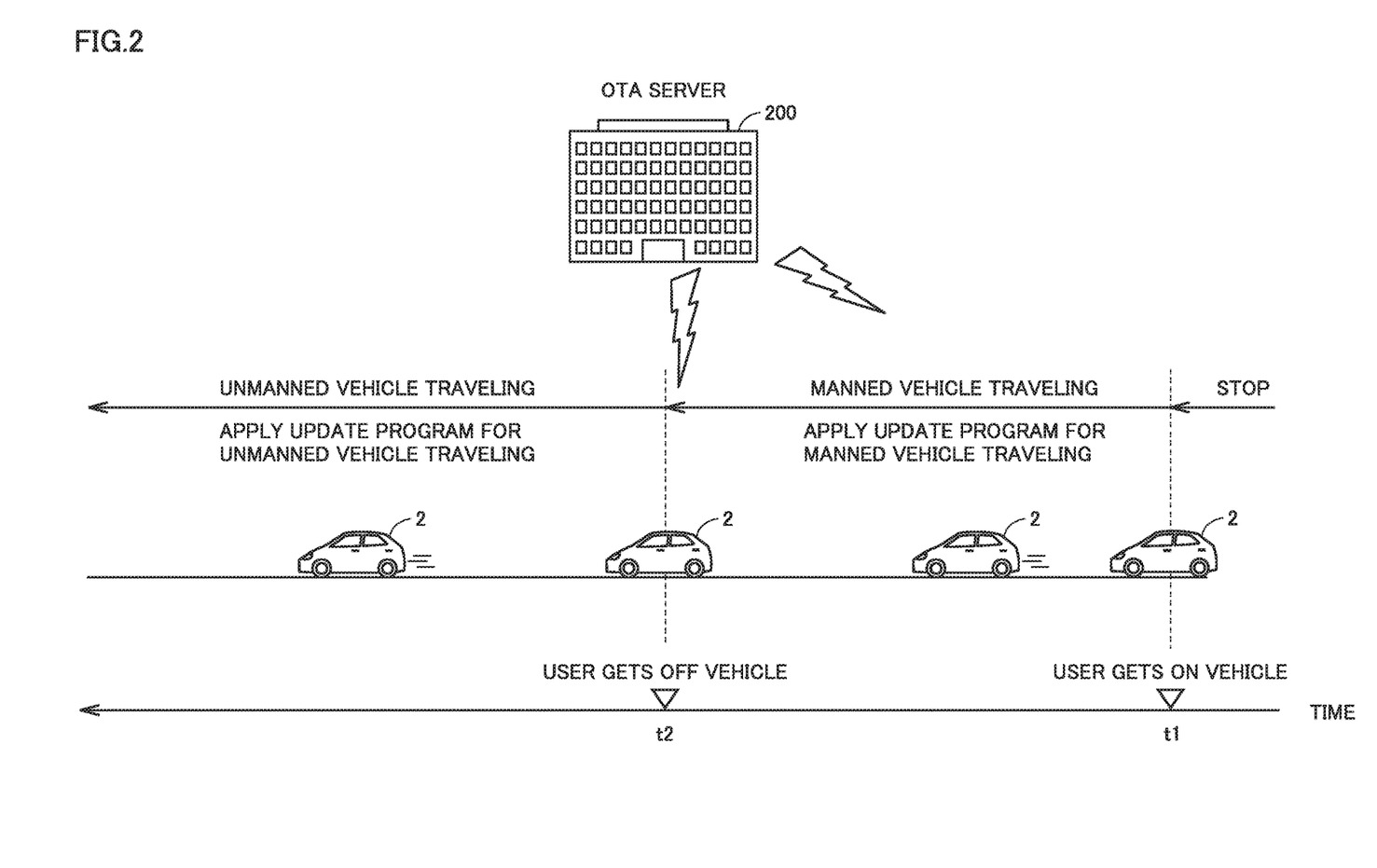
FIG. 2 is a diagram for illustrating update of a diagnosis program according to a first embodiment.

FIG. 2 is a diagram for illustrating update of the diagnosis program according to the first embodiment. Referring to FIG. 2, OTA server 200 has, as the update programs, an update program for manned vehicle traveling applied when vehicle 2 travels with an occupant on board, and an update program for unmanned vehicle traveling applied when vehicle 2 travels with an occupant not on board. The update program for manned vehicle traveling and the update program for unmanned vehicle traveling are replaced with new update programs every time new update is prepared. The update program for manned vehicle traveling according to the first embodiment corresponds to "first update program" according to the present disclosure. The update program for unmanned vehicle traveling according to the first embodiment corresponds to "second update program" according to the present disclosure.

When vehicle 2 obtains the update program for manned vehicle traveling from OTA server 200, vehicle 2 updates the diagnosis program stored in storage unit 120 of ECU 100, using the obtained update program for manned vehicle traveling. When vehicle 2 obtains the update program for unmanned vehicle traveling from OTA server 200, vehicle 2 updates the diagnosis program stored in storage unit 120 of ECU 100, using the obtained update program for unmanned vehicle traveling.

Description will be given with reference to a specific example. Referring to FIG. 2, let us assume, for example, that the user gets on vehicle 2 in a stop state and manned vehicle traveling is started at time t1. "In the stop state" refers to a state in which vehicle 2 is not started up.

In the above-described case, vehicle 2 travels with the user on board, and thus, vehicle 2 requests the update program for manned vehicle traveling from OTA server 200. Then, when vehicle 2 obtains the update program for manned vehicle traveling from OTA server 200, vehicle 2 updates the diagnosis program stored in storage unit 120 of ECU 100, using the obtained update program for manned vehicle traveling.

Let us assume that the user then gets off vehicle 2 at time t2, and after the user gets off vehicle 2, vehicle 2 travels with an occupant not on board, to a location specified by another user. That is, let us assume that the traveling state of vehicle 2 is switched from manned vehicle traveling to unmanned vehicle traveling at time t2. In this case, vehicle 2 travels with an occupant not on board, and thus, vehicle 2 requests the update program for unmanned vehicle traveling from OTA server 200. When vehicle 2 obtains the update program for unmanned vehicle traveling from OTA server 200, vehicle 2 updates the diagnosis program stored in storage unit 120 of ECU 100, using the obtained update program for unmanned vehicle traveling.

As described above, when vehicle 2 travels with an occupant on board, the update program for manned vehicle traveling is obtained and the diagnosis program is updated by the OTA, and when vehicle 2 travels with an occupant not on board, the update program for unmanned vehicle traveling is obtained and the diagnosis program is updated by the OTA. As a result, in manned vehicle traveling, the diagnosis program is updated to detect the actual failure of each device, and in unmanned vehicle traveling, the diagnosis program is updated to detect the potential failure in addition to the actual failure of each device.

That is, when the user is on vehicle 2, the self-diagnosis is performed using the diagnosis program that is not made sensitive. When the user is not on vehicle 2, the self-diagnosis is performed using the diagnosis program that is made sensitive.

Various known methods can be applied to determination as to whether vehicle 2 travels with an occupant not on board or vehicle 2 travels with an occupant on board. For example, determination may be made using a seating sensor, or determination may be made using a vehicle-mountable camera that captures an image of the interior of vehicle 2. Alternatively, when vehicle 2 in the stop state is started up by operation of a start button (operation by the user), it may be determined that vehicle 2 travels with an occupant on board.

In FIG. 2, description has been given of the example in which manned vehicle traveling is started from the stop state of vehicle 2. However, unmanned vehicle traveling may, for example, be started from the stop state of vehicle 2. In this case, vehicle 2 travels with an occupant not on board, and thus, vehicle 2 requests the update program for unmanned vehicle traveling from OTA server 200. When vehicle 2 obtains the update program for unmanned vehicle traveling from OTA server 200, vehicle 2 updates the diagnosis program stored in storage unit 120 of ECU 100, using the obtained update program for unmanned vehicle traveling.

Thereafter, when the user gets on vehicle 2 at a certain point, for example, the traveling state of vehicle 2 is switched from unmanned vehicle traveling to manned vehicle traveling. In this case, vehicle 2 travels with the user on board, and thus, vehicle 2 requests the update program for manned vehicle traveling from OTA server 200. When vehicle 2 obtains the update program for manned vehicle traveling from OTA server 200, vehicle 2 updates the diagnosis program stored in storage unit 120 of ECU 100, using the obtained update program for manned vehicle traveling.

<<Threshold Range>>

In the first embodiment, a threshold range included in the update program for unmanned vehicle traveling (hereinafter, also referred to as "unmanned vehicle traveling threshold range") is set to be narrower than a threshold range included in the update program for manned vehicle traveling (hereinafter, also referred to as "manned vehicle traveling threshold range").

Figure 3:
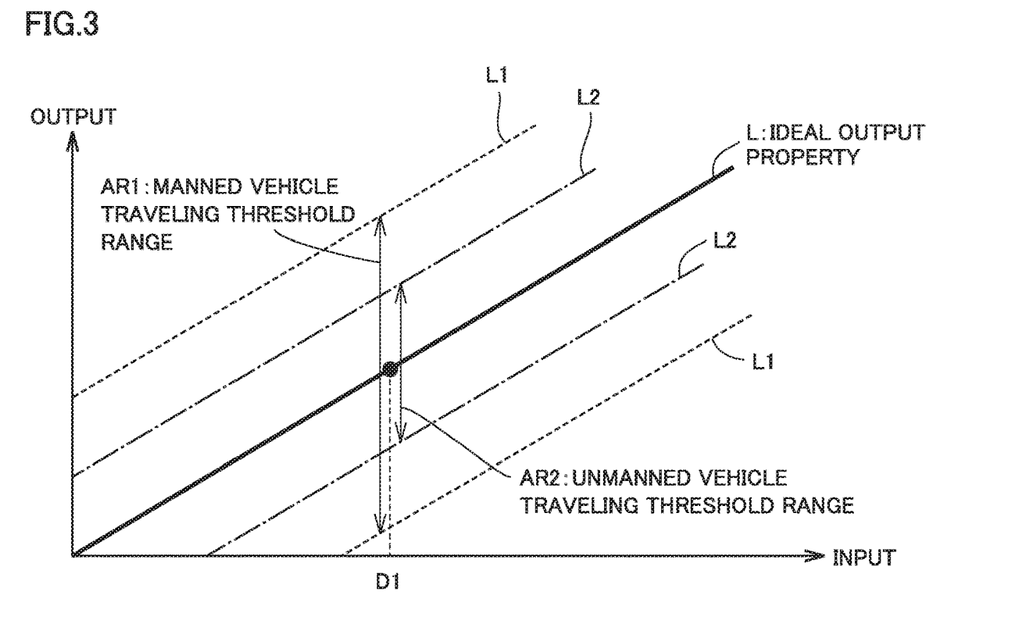
FIG. 3 is a diagram for illustrating threshold ranges of the diagnosis program.

FIG. 3 is a diagram for illustrating the threshold ranges of the diagnosis program. Referring to FIG. 3, FIG. 3 shows an ideal output property of a certain device and two threshold ranges (the manned vehicle traveling threshold range and the unmanned vehicle traveling threshold range). A solid line L in FIG. 3 indicates the ideal output property, a range defined by two broken lines L1 indicates the manned vehicle traveling threshold range, and a range defined by two alternate long and short dash lines L2 indicates the unmanned vehicle traveling threshold range. The manned vehicle traveling threshold range is a threshold range that is set such that deviation from this range can be detected as an actual failure. The unmanned vehicle traveling threshold range is a threshold range that is set such that deviation from this range can be detected as an actual failure or a potential failure. As can be recognized from FIG. 3, by making the unmanned vehicle traveling threshold range narrower than the manned vehicle traveling threshold range, the potential failure can be detected using the unmanned vehicle traveling threshold range.

The above-described certain device is, for example, the cooling fan for cooling power storage device 10. An actuator of the cooling fan is, for example, controlled such that the cooling fan rotates at a rotation speed corresponding to a duty ratio of an input duty signal. That is, an input in FIG. 3 can represent the duty ratio of the duty signal, and an output in FIG. 3 can represent the rotation speed. The ideal output property of the cooling fan is set based on, for example, the specifications of the cooling fan and the like.

As one example, let us assume that a duty signal D1 is input. In FIG. 3, the manned vehicle traveling threshold range of output with respect to the input is indicated by AR1, and the unmanned vehicle traveling threshold range of output with respect to the input is indicated by AR2. In FIG. 3, for ease of visible recognition, manned vehicle traveling threshold range AR1 and unmanned vehicle traveling threshold range AR2 are shown as being displaced from a plot on the ideal output property with respect to duty signal D1.

When the diagnosis program updated using the update program for manned vehicle traveling is executed, it can be determined that the cooling fan has an actual failure, in the case where the output with respect to duty signal D1 is not within manned vehicle traveling threshold range AR1. When the diagnosis program updated using the update program for unmanned vehicle traveling is executed, it can be determined that the cooling fan has an actual failure or an actual failure may occur in the cooling fan, in the case where the output with respect to duty signal D1 is not within unmanned vehicle traveling threshold range AR2.

<Process Performed by ECU>

<<Self-Diagnosis>>

Figure 4:
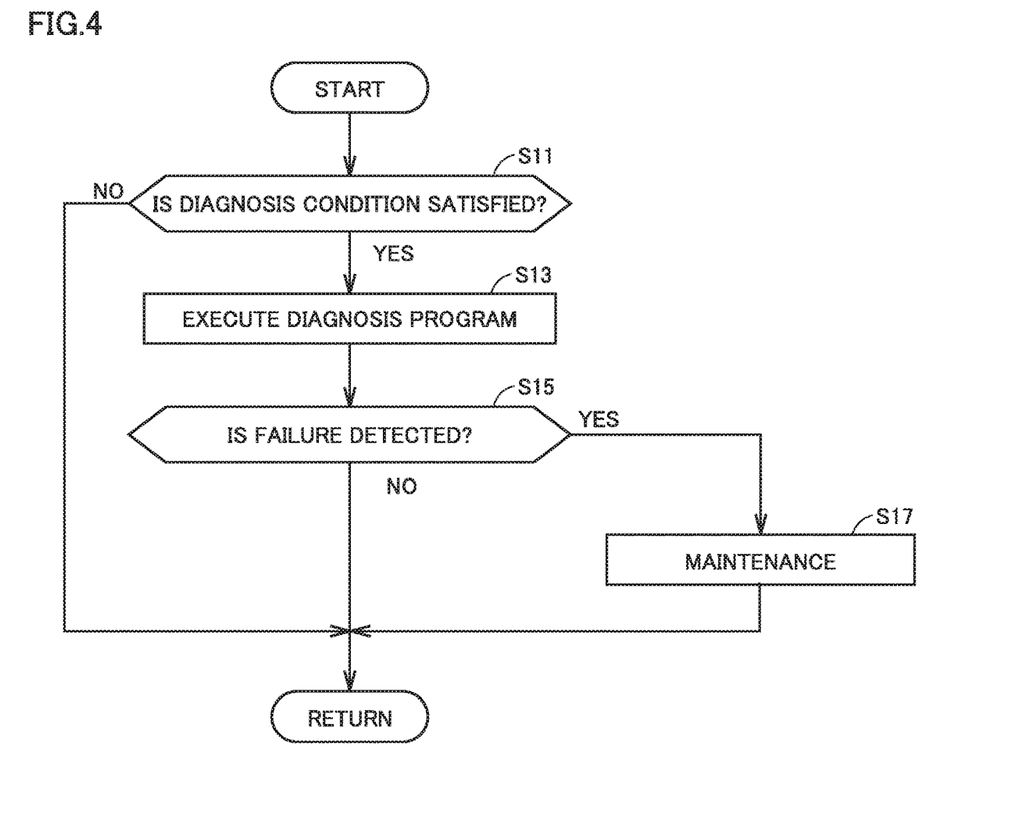
FIG. 4 is a flowchart showing a process procedure for self-diagnosis in the first embodiment.

FIG. 4 is a flowchart showing a process procedure for self-diagnosis in the first embodiment. The flowchart is repeatedly performed by ECU 100 every prescribed control cycle. Although each step (hereinafter, abbreviated as "S") shown in FIG. 4 and FIGS. 5 to 7 below is described as being implemented by software processing with ECU 100, a part or all of the steps may be implemented by hardware (electric circuit) fabricated in ECU 100.

ECU 100 determines whether or not the diagnosis condition is satisfied (S11). When the diagnosis condition is not satisfied (NO in S11), ECU 100 ends the process.

When the diagnosis condition is satisfied (YES in S11), ECU 100 executes the diagnosis program corresponding to the satisfied diagnosis condition (S13). Specifically, control unit 130 of ECU 100 reads the diagnosis program corresponding to the satisfied diagnosis condition from storage unit 120, and executes the diagnosis program.

Based on execution of the diagnosis program, ECU 100 determines whether or not a failure is detected (S15). Specifically, control unit 130 of ECU 100 calculates the property of the device to be self-diagnosed, and determines whether or not the calculated property is outside the threshold range. When the calculated property is not outside the threshold range, control unit 130 determines that there is no abnormality (the failure is not detected). When the calculated property is outside the threshold range, control unit 130 determines that there is an abnormality (the failure is detected).

When the failure is not detected (NO in S15), ECU 100 ends the process. On the other hand, when the failure is detected (YES in S15), ECU 100 performs maintenance response (S17). The maintenance response refers to, for example, control of vehicle 2 to cause vehicle 2 to travel toward a repair shop, or control for restricting traveling of vehicle 2, or provision of a warning.

<<Update of Diagnosis Program>>

Figure 5:
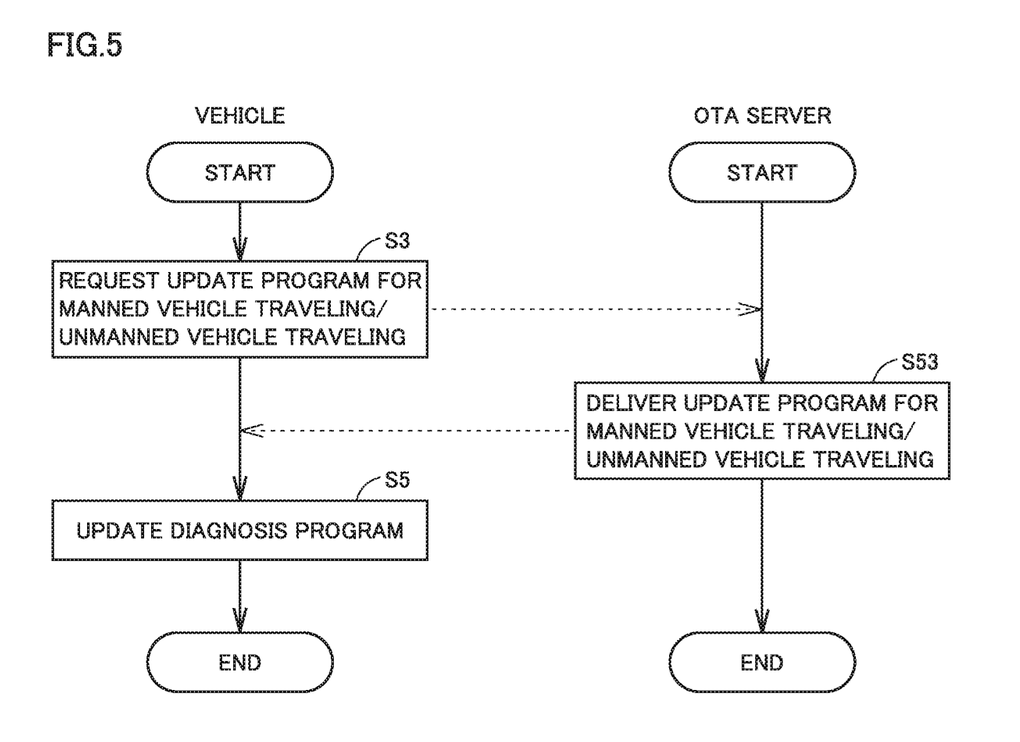
FIG. 5 is a flowchart showing a process procedure for updating the diagnosis program in the first embodiment.

FIG. 5 is a flowchart showing a process procedure for updating the diagnosis program in the first embodiment. The flowchart is called from the main routine and performed when the traveling state of vehicle 2 is switched.

The switching of the traveling state of vehicle 2 includes, for example, (1) switching from manned vehicle traveling to unmanned vehicle traveling, (2) switching from the stop state of vehicle 2 to unmanned vehicle traveling, (3) switching from unmanned vehicle traveling to manned vehicle traveling, and (4) switching from the stop state of vehicle 2 to manned vehicle traveling. The switching in (1) and (2) described above refers to the case in which vehicle 2 travels with an occupant not on board. The switching in (3) and (4) described above refers to the case in which vehicle 2 travels with an occupant on board.

When the traveling state of vehicle 2 is switched, ECU 100 starts the process. First, description will be given of (1) switching from manned vehicle traveling to unmanned vehicle traveling as described above, or (2) switching from the stop state of vehicle 2 to unmanned vehicle traveling as described above.

When the traveling state of vehicle 2 is switched from manned vehicle traveling to unmanned vehicle traveling, or when the traveling state of vehicle 2 is switched from the stop state of vehicle 2 to unmanned vehicle traveling, ECU 100 requests delivery of the update program for unmanned vehicle traveling from OTA server 200 (S3). Specifically, control unit 130 of ECU 100 requests delivery of the update program for unmanned vehicle traveling from OTA server 200 through communication device 83.

When OTA server 200 receives the request for delivery of the update program for unmanned vehicle traveling from vehicle 2, OTA server 200 delivers the update program for unmanned vehicle traveling to vehicle 2 (S53).

When ECU 100 receives the update program for unmanned vehicle traveling from OTA server 200, ECU 100 updates the diagnosis program using the received update program for unmanned vehicle traveling (S5). Specifically, when control unit 130 of ECU 100 receives the update program for unmanned vehicle traveling from OTA server 200 through communication device 83, control unit 130 of ECU 100 updates the diagnosis program stored in storage unit 120, using the received update program for unmanned vehicle traveling.

As a result, the diagnosis program is made sensitive. Therefore, the diagnosis program that is made sensitive is executed when the diagnosis condition is satisfied during unmanned vehicle traveling, and thus, the potential failure can be detected in addition to the actual failure.

Next, description will be given of (3) switching from unmanned vehicle traveling to manned vehicle traveling as described above, or (4) switching from the stop state of vehicle 2 to manned vehicle traveling as described above.

When the traveling state of vehicle 2 is switched from unmanned vehicle traveling to manned vehicle traveling, or when the traveling state of vehicle 2 is switched from the stop state of vehicle 2 to manned vehicle traveling, ECU 100 requests delivery of the update program for manned vehicle traveling from OTA server 200 (S3). Specifically, control unit 130 of ECU 100 requests delivery of the update program for manned vehicle traveling from OTA server 200 through communication device 83.

When OTA server 200 receives the request for delivery of the update program for manned vehicle traveling from vehicle 2, OTA server 200 delivers the update program for manned vehicle traveling to vehicle 2 (S53).

When ECU 100 receives the update program for manned vehicle traveling from OTA server 200, ECU 100 updates the diagnosis program using the received update program for manned vehicle traveling (S5). Specifically, when control unit 130 of ECU 100 receives the update program for manned vehicle traveling from OTA server 200 through communication device 83, control unit 130 of ECU 100 updates the diagnosis program stored in storage unit 120, using the received update program for manned vehicle traveling.

As a result, the diagnosis program is updated from the state of being made sensitive to the state of not being made sensitive. Therefore, the diagnosis program that is not made sensitive is executed when the diagnosis condition is satisfied during manned vehicle traveling. The failure detected as a result of execution of the diagnosis program is only the actual failure, and the potential failure is not detected.

As described above, in the first embodiment, when vehicle 2 travels with an occupant on board, the update program for manned vehicle traveling is obtained and the diagnosis program is updated by the OTA, and when vehicle 2 travels with an occupant not on board, the update program for unmanned vehicle traveling is obtained and the diagnosis program is updated by the OTA. That is, in manned vehicle traveling, the diagnosis program is updated to detect the actual failure of each device of vehicle 2, and in unmanned vehicle traveling, the diagnosis program is updated to detect the potential failure in addition to the actual failure of each device of vehicle 2. By updating the diagnosis program by the OTA as appropriate when the traveling state of vehicle 2 is switched, self-diagnosis can be performed using the diagnosis program corresponding to the traveling state of vehicle 2. As a result, the actual failure can be detected in manned vehicle traveling, and the potential failure can be detected in addition to the actual failure in unmanned vehicle traveling. Since the potential failure is detected in unmanned vehicle traveling, a disadvantage to the user can be reduced, even if the potential failure is detected.

Second Embodiment

The first embodiment has been described with reference to the example in which the diagnosis program is updated by the OTA as appropriate when the traveling state of vehicle 2 is switched. As a result, self-diagnosis can be performed using the diagnosis program corresponding to the traveling state of vehicle 2. However, a diagnosis program for manned vehicle traveling and a diagnosis program for unmanned vehicle traveling may be stored in storage unit 120 of ECU 100 and used depending on the traveling state, for example. A second embodiment will be described with reference to an example in which a diagnosis program for manned vehicle traveling and a diagnosis program for unmanned vehicle traveling are stored in storage unit 120 of ECU 100.

Referring to FIG. 1, an update system 1A according to the second embodiment includes a vehicle 2A and an OTA server 200A.

OTA server 200A bidirectionally communicates with vehicle 2A through communication network 300.

OTA server 200A has an update program for manned vehicle traveling applied when vehicle 2A travels with an occupant on board, and an update program for unmanned vehicle traveling when vehicle 2A travels with an occupant not on board. The update program for manned vehicle traveling and the update program for unmanned vehicle traveling are replaced with new update programs every time new update is prepared.

When the update program for manned vehicle traveling and/or the update program for unmanned vehicle traveling is/are updated, OTA server 200A transmits the updated update program for manned vehicle traveling and/or the updated update program for unmanned vehicle traveling to vehicle 2A.

Vehicle 2A is different from vehicle 2 according to the first embodiment in that vehicle 2A includes an ECU 100A instead of ECU 100. The remaining configuration is the same as that of vehicle 2 according to the first embodiment, and thus, description will not be repeated.

ECU 100A includes information obtaining unit 110, a storage unit 120A and a control unit 130A. Information obtaining unit 110 in the second embodiment is also the same as that in the first embodiment, and thus, description will not be repeated.

Storage unit 120A stores, as the diagnosis programs, the diagnosis program for manned vehicle traveling and the diagnosis program for unmanned vehicle traveling. The diagnosis program for manned vehicle traveling is a diagnosis program that is not made sensitive. The diagnosis program for unmanned vehicle traveling is a diagnosis program that is made sensitive. The diagnosis program for manned vehicle traveling according to the second embodiment corresponds to "first program" according to the present disclosure. The diagnosis program for unmanned vehicle traveling according to the second embodiment corresponds to "second program" according to the present disclosure.

When vehicle 2 travels with an occupant on board, control unit 130A reads the diagnosis program for manned vehicle traveling from storage unit 120A and performs self-diagnosis using the diagnosis program for manned vehicle traveling. When vehicle 2 travels with an occupant not on board, control unit 130A reads the diagnosis program for unmanned vehicle traveling from storage unit 120A and performs self-diagnosis using the diagnosis program for unmanned vehicle traveling.

When control unit 130A receives the update program for manned vehicle traveling from OTA server 200A through communication device 83, control unit 130A updates the diagnosis program for manned vehicle traveling using the received update program for manned vehicle traveling. When control unit 130A receives the update program for unmanned vehicle traveling from OTA server 200A through communication device 83, control unit 130A updates the diagnosis program for unmanned vehicle traveling using the received update program for unmanned vehicle traveling.

<Process Performed by ECU>
<<Self-Diagnosis>>

Figure 6:
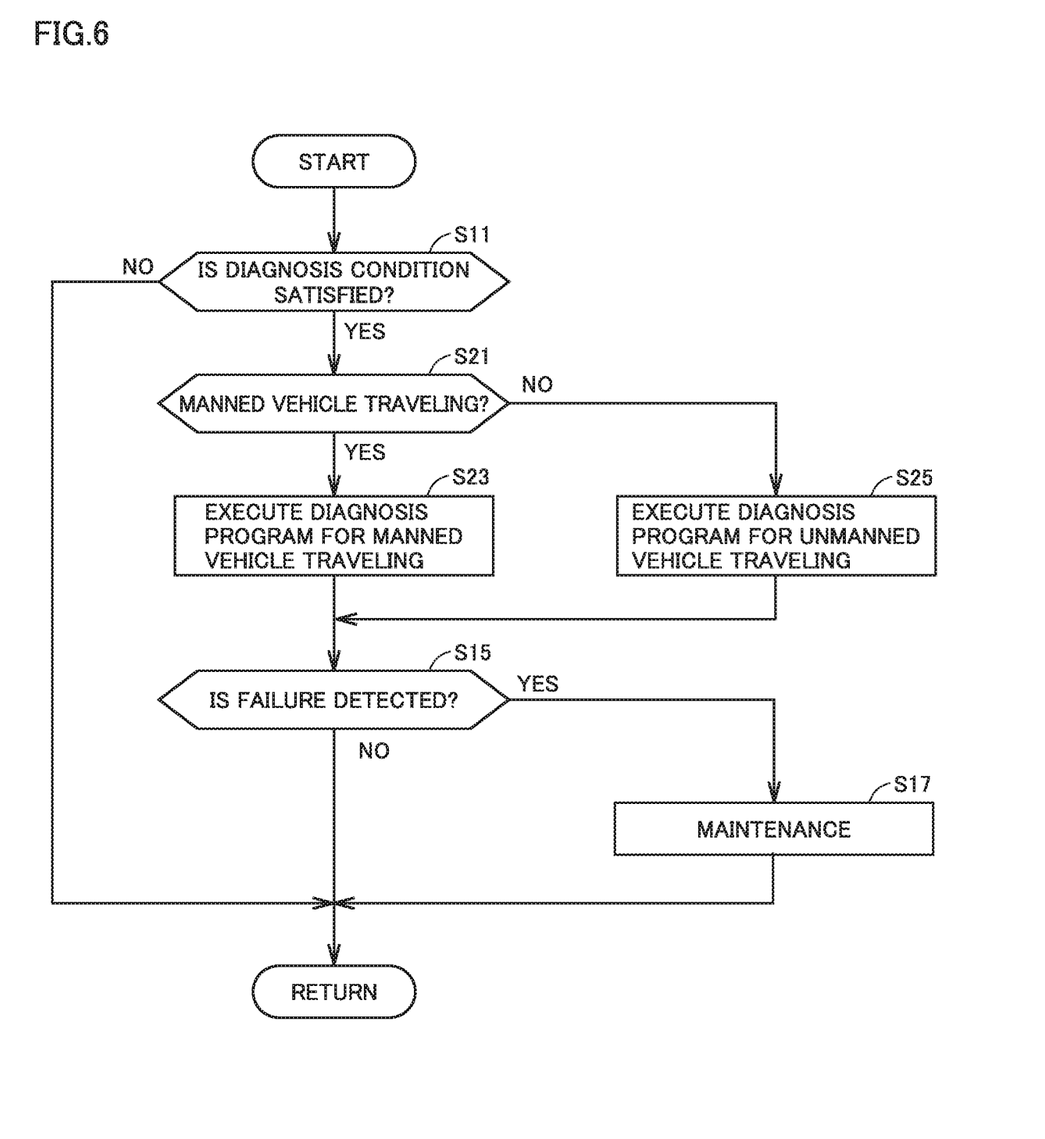
FIG. 6 is a flowchart showing a process procedure for self-diagnosis in a second embodiment.

FIG. 6 is a flowchart showing a process procedure for self-diagnosis in the second embodiment. The flowchart is repeatedly performed by ECU 100A every prescribed control cycle. The flowchart is different from the flowchart in FIG. 4 in that the flowchart includes S21 to S25 instead of S13. The same steps as those of the flowchart in FIG. 4 are denoted by the same numerals as those of the flowchart in FIG. 4 and description will not be repeated.

When the diagnosis condition is satisfied during traveling of vehicle 2A (YES in S11), ECU 100A determines the traveling state of vehicle 2A (S21). Specifically, ECU 100A determines whether or not vehicle 2A travels with an occupant on board (S21).

When vehicle 2A travels with an occupant on board (YES in S21), ECU 100A executes the diagnosis program for manned vehicle traveling (S23). Specifically, control unit 130A of ECU 100A reads the diagnosis program for manned vehicle traveling corresponding to the satisfied diagnosis condition from storage unit 120A and executes the read diagnosis program for manned vehicle traveling.

On the other hand, when vehicle 2A travels with an occupant not on board (NO in S21), ECU 100A executes the diagnosis program for unmanned vehicle traveling (S25). Specifically, control unit 130A of ECU 100A reads the diagnosis program for unmanned vehicle traveling corresponding to the satisfied diagnosis condition from storage unit 120A and executes the read diagnosis program for unmanned vehicle traveling.

<<Update of Diagnosis Program>>

Figure 7:
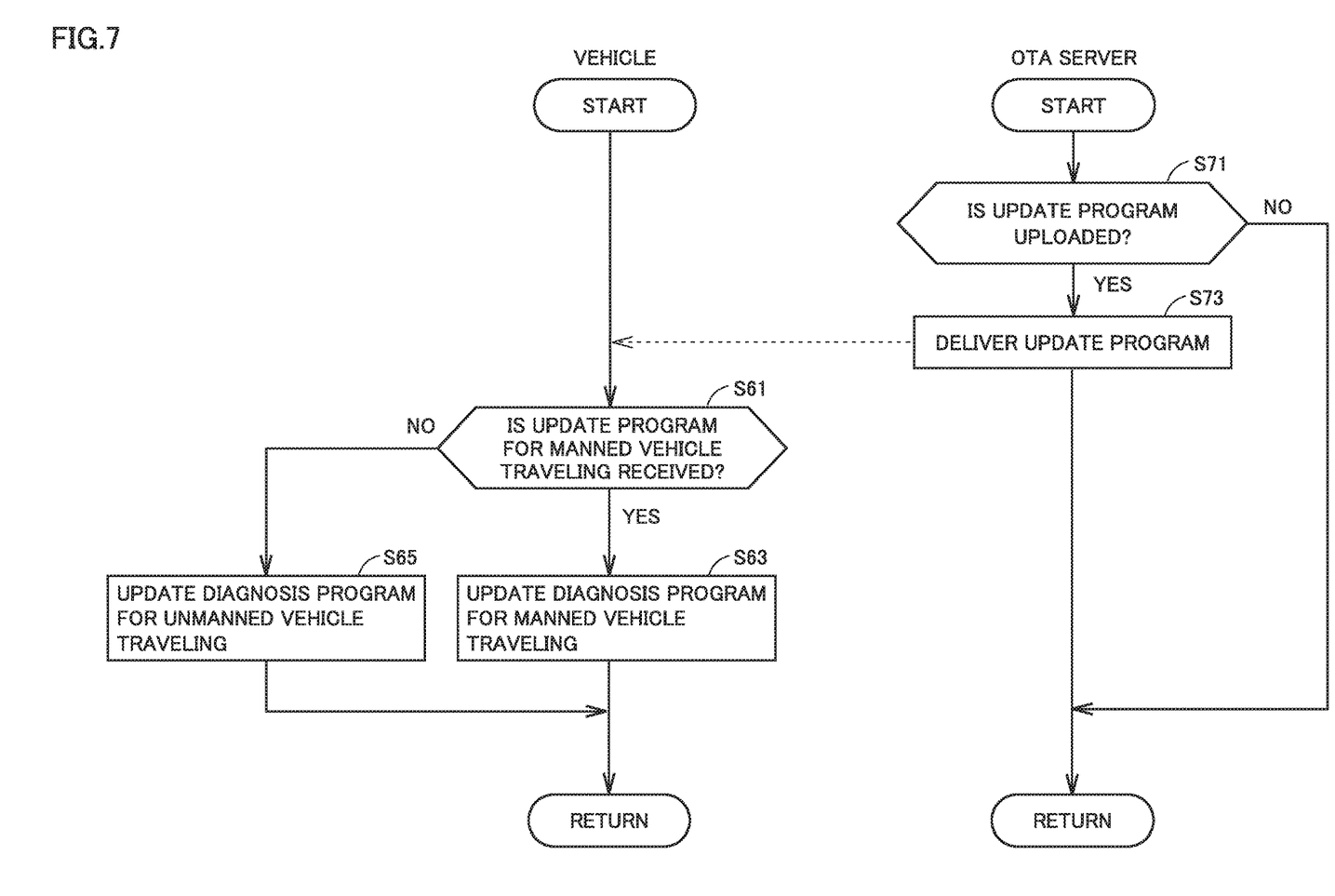
FIG. 7 is a flowchart showing a process procedure for updating a diagnosis program in the second embodiment.

FIG. 7 is a flowchart showing a process procedure for updating the diagnosis program in the second embodiment. The flowchart is repeatedly performed every prescribed cycle.

When the prescribed cycle comes, OTA server 200A determines whether or not the update program is uploaded (S71). When both the update program for manned vehicle traveling and the update program for unmanned vehicle traveling are not uploaded (NO in S71), OTA server 200A ends the process.

When at least one of the update program for manned vehicle traveling and the update program for unmanned vehicle traveling is uploaded (YES in S71), OTA server 200A delivers the uploaded update program to vehicle 2A (S73).

When ECU 100A receives the update program, ECU 100A determines whether the received update program is the update program for manned vehicle traveling or the update program for unmanned vehicle traveling (S61).

When ECU 100A receives the update program for manned vehicle traveling (YES in S61), ECU 100A updates the diagnosis program for manned vehicle traveling using the received update program for manned vehicle traveling (S63). Specifically, control unit 130A updates the diagnosis program for manned vehicle traveling stored in storage unit 120A, using the received update program for manned vehicle traveling.

When ECU 100A receives the update program for unmanned vehicle traveling (NO in S61), ECU 100A updates the diagnosis program for unmanned vehicle traveling using the received update program for unmanned vehicle traveling (S63). Specifically, control unit 130A updates the diagnosis program for unmanned vehicle traveling stored in storage unit 120A, using the received update program for unmanned vehicle traveling.

When ECU 100A receives both the update program for manned vehicle traveling and the update program for unmanned vehicle traveling from OTA server 200A, both the processing in S63 and the processing in S65 may be performed.

As described above, in the second embodiment, the diagnosis program for manned vehicle traveling and the diagnosis program for unmanned vehicle traveling are stored, and the diagnosis program for manned vehicle traveling and the diagnosis program for unmanned vehicle traveling are used depending on the traveling state of vehicle 2A. Thus, when vehicle 2A travels with an occupant on board, the diagnosis program that is not made sensitive (diagnosis program for manned vehicle traveling) can be used, and when vehicle 2A travels with an occupant not on board, the diagnosis program that is made sensitive (diagnosis program for unmanned vehicle traveling) can be used. As a result, the actual failure can be detected in manned vehicle traveling, and the potential failure can be detected in addition to the actual failure in unmanned vehicle traveling. Since the potential failure is detected in unmanned vehicle traveling, a disadvantage to the user can be reduced, even if the potential failure is detected.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A vehicle capable of automated driving, the vehicle comprising:
   a storage device that stores a program for diagnosing a failure of a device mounted on the vehicle;
   a controller that executes the program when a diagnosis condition is satisfied during traveling of the vehicle; and
   a communication device that communicates with a server that delivers an update program for updating the program, wherein
   the controller determines the failure of the device based on whether or not a property of the device calculated by execution of the program is outside a threshold range,
   the server has, as the update program, a first update program applied when the vehicle travels with an occupant on board, and a second update program applied when the vehicle travels with an occupant not on board,
   the first update program and the second update program have a same sequence for calculating the property of the device,
   a threshold range included in the second update program is narrower than a threshold range included in the first update program, and
   the controller obtains the first update program from the server and updates the program using the obtained first update program, when the vehicle travels with an occupant on board,
   the controller obtains the second update program from the server and updates the program using the obtained second update program, when the vehicle travels with an occupant not on board.

2. A vehicle capable of automated driving, the vehicle comprising:
   a storage device that stores a program for diagnosing a failure of a device mounted on the vehicle;
   a controller that executes the program when a diagnosis condition is satisfied during traveling of the vehicle; and
   a communication device that communicates with a server that delivers an update program for updating the program, wherein
   the controller determines the failure of the device based on whether or not a property of the device calculated by execution of the program is outside a threshold range,
   the storage device stores, as the program, a first program used when the vehicle travels with an occupant on board, and a second program used when the vehicle travels with an occupant not on board,
   the server has, as the update program, a first update program applied when the vehicle travels with an occupant on board, and a second update program applied when the vehicle travels with an occupant not on board, the first update program and the second update program have a same sequence for calculating the property of the device, a threshold range included in the second update program is narrower than a threshold range included in the first update program, and the controller diagnoses the failure of the device using the first program when the vehicle travels with an occupant on board, and diagnoses the failure of the device using the second program when the vehicle travels with an occupant not on board, after the controller receives the first update program, the controller updates the first program using the received first update program, and after the controller receives the second update program, the controller updates the second program using the received second update program.

\* \* \* \* \*